United States Patent
McAlpin et al.

(10) Patent No.: US 11,067,475 B2
(45) Date of Patent: Jul. 20, 2021

(54) BEDLOAD TRANSPORT METHODOLOGY AND METHOD OF USE

(71) Applicants: Tate O McAlpin, Magee, MS (US);
David Abraham, Vicksburg, MS (US);
John Shelley, Independence, MO (US);
Thad C Pratt, Vicksburg, MS (US)

(72) Inventors: Tate O McAlpin, Magee, MS (US);
David Abraham, Vicksburg, MS (US);
John Shelley, Independence, MO (US);
Thad C Pratt, Vicksburg, MS (US)

(73) Assignee: UNITED STATES of AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 13/854,721

(22) Filed: Apr. 1, 2013

(65) Prior Publication Data
US 2017/0030800 A1 Feb. 2, 2017

(51) Int. Cl.
*G01M 10/00* (2006.01)

(52) U.S. Cl.
CPC .................. *G01M 10/00* (2013.01)

(58) Field of Classification Search
CPC .... G01M 10/00; G01S 1/72; G01V 2210/661; G01V 2210/66; G01V 99/005
See application file for complete search history.

(56) References Cited

U.S. PATENT DOCUMENTS

| | | | |
|---|---|---|---|
| 5,844,799 A * | 12/1998 | Joseph ............... | G01V 11/00 702/2 |
| 7,117,091 B2 * | 10/2006 | Masson .............. | G01V 1/282 702/5 |
| 7,337,069 B2 * | 2/2008 | Masson .............. | G01V 1/282 702/14 |
| 8,605,549 B1 * | 12/2013 | DiCecco ............ | G06K 9/6284 367/88 |
| 2002/0099504 A1 * | 7/2002 | Cross ................. | G01V 11/00 702/2 |

OTHER PUBLICATIONS

McElroy et al., Nature of deformation of sandy bed forms, Aug. 2009, Journal of Geophysical Research, vol. 114, pp. 1-13(Year: 2009).*
Nittrouer et al., Bedform transport rates for the lower Mississippi River, Journal of Geophysical Research, vol. 113, pp. 1-16 (Year: 2008).*
Abraham, David, A New Method for the Measurement of Bedload Transport Using Time Sequenced Bathymetric Data, May 2009 Proquest Dissertations and Theses, Chapter 5 pp. 51-61 (Year: 2009).*
Rauf Ramoozand Colin D. Rennie, Laboratory Measurement of Bedload with an ADCP, Published online in 2010 as part of U.S. Geological Survey Scientific Investigations Report 2010-5091 (Year: 2010).*

* cited by examiner

*Primary Examiner* — Lina M Cordero
(74) *Attorney, Agent, or Firm* — Brian C. Jones

(57) ABSTRACT

A method for determining an estimate of an overall bedload transport rate by using bedload transport rates for a plurality of subswaths involves, generally, performing a bathymetry survey in areas at multiple times, calculating an amount of erosion and deposition and their ratio, and calculating an erosion and a deposition transport rate using the provided equations.

20 Claims, 12 Drawing Sheets

Movement of Wave as % of wavelength

BEDLOAD TRANSPORT METHODOLOGY AND METHOD OF USE

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees. Please contact Phillip Stewart at 601 634-4113.

BACKGROUND

One of the river engineer's major challenges is the measurement of bed load transport. Such measurements are critical for assessing the stability of a river and sedimentation impacts on infrastructure and navigation. An accurate assessment of the rate of bed load transport into and out of a reach must be achieved for the successful restoration of impacted channel reaches. Shields, et al., *Stream Restoration in Sedimentation Engineering, Processes, Measurements, Modeling Practice, ASCE Manual no.* 110, Garcia, M. H., ed., American Society of Civil Engineers, Reston, Va., 2008.

Yet rates and sizes of sediment in transport as bed load have been shown to vary dramatically with time at a point, and spatially at a given time over a cross section of channel. Carey, W. P., *Variability in Measured Bedload-Transport Rates, American Water Resources Association, Water Resources Bull.*, 21(1), 39-48, 1985; Kuhnle, R. A. and J. B. Southard, *Bed Load Transport Fluctuations in a Gravel Bed Laboratory Channel, Water Resources Research,* 24(2), 247-260, 1988; Gray, J. R., et al., *Low-Flow Sediment Transport in the Colorado River*, Fifth Federal Interagency Sedimentation Conference, Subcommittee on Sedimentation, Interagency Advisory Committee on Water Data, Las Vegas, Nev., 4-63-4-7, 11991. Spatial and temporal variability poses the challenge of collecting accurate bed load data over a wide range of transport rates and collecting a sufficient number of samples spatially to adequately define the mean bed load transport rate for a given set of flow and sediment conditions. Singh, A. et al, *Experimental Evidence for Statistical Scaling and Intermittency in Sediment Transport Rates, Journal of Geophysical Research*. Vol. 114, F01025, doi:10.1029/2007JF000963, 2009; Bunte, K., and S. R. Abt, *Effect of Sampling Time on Measured Gravel Bed Load Transport Rates in a Coarse-Bedded Stream, Water Resour. Res.,* 41, W11405, doi:10.1029/2004WR003880, 2005. A large sand-bed river is an especially difficult environment for sampling of bed load with currently available samplers. Kuhnle, R. A., *Bed Load Samplers in Sedimentation Engineering, Processes, Measurements, Modeling Practice,* ASCE Manual no. 110, Garcia, M. H., ed., American Society of Civil Engineers, Reston, Va., 2008. Bed-form tracking is one technique that has been used in the past to compute bed load transport in sand bed streams with dunes. Simons, D. B., et al., *Bedload Equation for Ripples and Dunes*, U. S. Geological Survey Professional Paper 462-H, 1965; Dinehart, R. L., *Bed Form Movement Recorded by Sequential Single-Beam Surveys in Tidal Rivers, Journal of Hydrology,* 258, 25-39, 2002; Wilbers, A., *The Development and Hydraulic Roughness of Subaqueous Dunes*, Netherlands Geographical Studies 323, The Royal Dutch Geographical Society, Utrecht, Netherlands, 227 pages, 2004. Traditionally, this technique consists of measuring sizes and migration rates of dunes over a large enough area and over a suitable length of time.

Instead of measuring sizes and migration rates of dunes, measurements may be made of rates of bed erosion or scour associated with dune migration. Practical applications of this method have been demonstrated. Abraham, D., et al., *Measuring Bedload Transport on the Missouri River Using Time Sequenced Bathymetric Data,* Conference Paper, $2^{nd}$ Joint Federal Interagency Conference, Las Vegas, Nev., Jun. 27 to Jul. 1, 2010; Nittrouer, J. A., et al., *Bedform Transport Rates for the Lowermost Mississippi River, Journal of Geophysical Research*, Vol. 113, F03004, 2008. Also, the method has been tested under controlled laboratory conditions. Abraham, David, et al., *Validation of Bed Load Transport Measurements with Time Sequenced Bathymetric Data, Journal of Hydraulic Engineering,* 723, ASCE, July 2011.

Physical samplers used on large sand bed rivers generally incur numerous technical problems, are costly and time consuming. It is beneficial to employ a methodology to compute bedload transport, e.g., sand moving in waves on the bottom of a river in large sand bed rivers. Abraham, D., and T. Pratt, *Quantification of Bedload Transport on the Upper Mississippi River Using Multibeam Survey Data and Traditional Methods*, USACE-ERDC/CHL Technical Note, CHETN-VII-4, June 2002. Nittrouer, J A., et al (2008).

The initial idea of using sequential bathymetric data to obtain bedload measurements as suggested by Abraham and Pratt (2002) was used by Nittrouer et al (2008) to produce bedload computations. Select embodiments of the present invention differ from Nittrouer by a factor of two, dividing the eroded volume by two to account for triangular bed forms to obtain a realistic transport rate. Nittrouer uses the depositional volume and does not halve the resulting transport rate. Select embodiments of the present invention screen data sets for non-equilibrium transport conditions, required when using field data, as described below in detail. A proof of concept analysis was performed using flume data. Abraham et al. (2011).

A predecessor technique was pursued in 1998 at the U.S. Army Engineering Research and Development Center-Coastal and Hydraulics Laboratory (ERDC-CHL). The method, a first version of the Integrated Section, Surface Difference Over Time (ISSDOT), was tested in various applications. Abraham D., and T. Pratt, *Quantification of Bedload Transport on the Upper Mississippi River Using Multibeam Survey Data and Traditional Methods*, USACE ERDC/CHL Technical Note, CHETN-VII-4, June 2002; Abraham, D., and J. Hendrickson, *Effects of Drawdown and Structures on Bedload Transport in Pool 8 Navigation Channel*, USACE ERDC/CHL Technical Note, CHETN-VII-5, December 2003; Abraham, D., and R. Kuhnle, *Using High Resolution Bathymetric Data for Measuring Bedload Transport*, Conference Paper presented at the Joint 8th Federal Interagency Sedimentation Conference and 3rd Federal Interagency Hydrologic Modeling Conference, Reno Nev., April 2006. During these tests it became obvious that modifications of the early version of the method were necessary. See page 19, Abraham et al. (2006). Following additional research at ERDC-CHL and the University of Iowa, the method was modified to include appropriate accounting of mass conservation and renamed ISSDOTv2.

Sands moving in the bed of a river are no longer viewed simply as a nuisance or problem related to dredging requirements. They are viewed as an important resource. River engineers and managers are now asked on a regular basis to allocate bed sediment resources to a variety of competing purposes and interests. They must address critical issues such as land-building in the Louisiana Coastal Areas (LCA), and commercial sand mining in many locations throughout the country. With regards to environmental concerns related to the Endangered Species Act (ESA) and Environmental Impact Statements (EIS), managers must assess the availability of sand to maintain ecological habitat features of rivers such as islands and bars. They must address all these concerns in addition to the navigation requirements of maintaining adequate draft depths in the navigation channels and functionality of the locks and dams. In order to adequately address all of these various interests, river managers must have some idea of how much bed material is available, which is directly related to its rate of movement through a river system. If the mass transport rate can be determined and related to changes in river flow, then a bedload rating curve can be produced. The invention provides a much needed quantitative management tool for those tasked with allocating the river's sand resources.

Select embodiments of the present invention overcome the above problems and are quicker, more accurate and less intrusive than conventional methods employing physical samplers.

DETAILED DESCRIPTION

In select embodiments of the present invention, bathymetric data are used to compute bedload transport, employing both the underlying theoretical concept to produce a numerical value for bedload transport and using data collected from actual field conditions.

Theory

Select embodiments of the present invention employ a method in which the bedload transport is calculated directly from measurements of the bedform movement. Consider the movement of a dune in the downstream (x) direction as shown schematically in FIG. 1. Assume, as did Simons et al. (1965), that the dune is in equilibrium with steady, uniform flow and that its shape remains unchanged as it migrates downstream.

Figure 1:
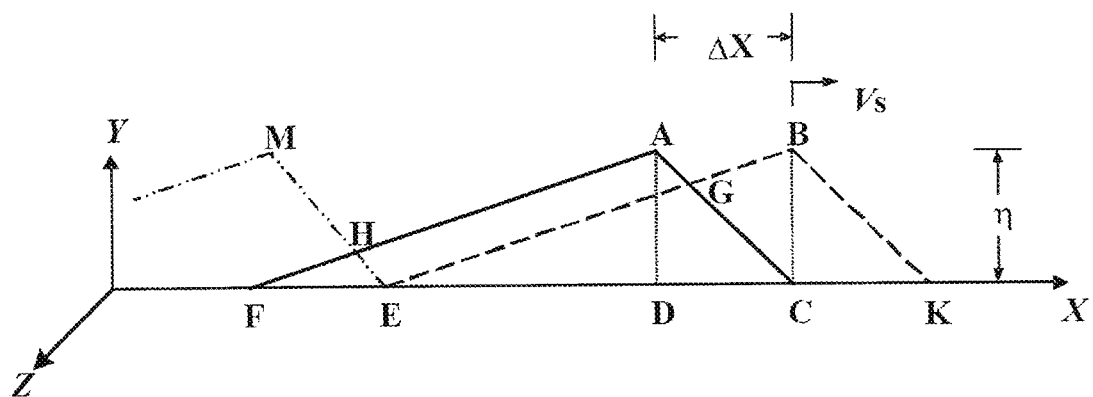
FIG. 1 is a schematic of a river bed form moving in the downstream direction.

Simons, D. B., et al., Bedload *Equation for Ripples and Dunes*, U.S. Geological Survey Professional Paper 462-H, 1965. In this case, the continuity equation for the bed form movement developed by Exner (1925) is $$(1-\rho)\frac{\partial y}{\partial t} + \frac{\partial q_v}{\partial x} = 0 \quad (1)$$

where:
$\rho$=porosity of sediment bed
y=bed elevation
t=time
$q_v$=volume rate of bedload transport per unit width of channel Note that Eqn. (1) applies to any bed profile and not just a triangle as shown in FIG. 1. Exner, F., *Uber die Wechselwirkung swischen Wasser und Geschibe in Flussen*, Proceedings, Vienna Academy of Sciences, Section IIA, Vol. 134, 1925. By introducing the velocity of the bed form, $V_s$, integration of this equation yields $$q_v = \beta(1-\rho)V_s\eta \quad (2)$$

where:
$\eta$=height of the dune crest measured from the dune trough
$\beta$=shape factor or bedload discharge coefficient. Wilbers, A., *The Development and Hydraulic Roughness of Subaqueous Dunes*, Netherlands Geographical Studies 323, The Royal Dutch Geographical Society, Utrecht, Netherlands, 227 pages, 2004. See Simons et al. (1965) and Engel, P. and Y. L. Lau, *Computation of Bed Load Using Bathymetric Data*, Journal of the Hydraulics Division, ASCE, Vol. 106, and No. HY3, 1980.

Thus, volumetric bedload transport is obtained from measurements of $V_s$ and $\eta$. In this integration it is assumed that there is no bedload movement in the dune trough. When the shape of a dune is approximated by a triangle (FIG. 1) and the position of zero bedload is the trough, as stated above, $\beta$=0.5. Otherwise, $\beta$ is different from 0.5. Wilbers, in his analysis of flume and field data, finds that Eqn. (2) is an appropriate relation for bedload transport when the value of $\beta$ is taken to be between 0.50 and 0.63 with a 'best' value of 0.57. A value different from 0.5 reflects the fact that the shape of real dunes deviates somewhat from a triangle, and the bedload transport might not be exactly zero in the trough.

The method tested in Abraham et al. (2011) is based on a modification of Eqn. (2). If the crest moves an average distance of $\Delta x$ during time interval $\Delta t$, Eqn. (2) reads $$q_v = \beta(1-\rho)\frac{\Delta x}{\Delta t}\eta \quad (3)$$

In Eqn. (3), the product of $\eta$ and $\Delta x$ is the volume of sand per unit width, $\Delta V$, that is moved during time interval $\Delta t$, i.e., $$\Delta V = \eta \Delta x \quad (4)$$

In FIG. 1, this volume is represented by area ABCD. By geometry, this area equals ABEF, which represents the volume per unit width that the upstream face of the dune scours during time interval Δt. It follows that an alternative to determining bedload transport, $q_v$, from measurement of $V_s$ and η is determining $q_v$ by measuring the rate of scour on the upstream face of dunes. Introducing density of sand, $\rho_s$, mass flow rate of sediment per unit width is $q_b = q_v \rho_s$, or $$q_b = \beta \rho_s (1-\rho) \frac{\Delta V}{\Delta t} \quad (5)$$

This equation allows bedload transport to be measured based on sequential measurements (measurements taken Δt apart) of elevations of the surfaces of the upstream face of dunes, rather than measurements based on dune height and speed from Eqn. (2). The method, however, requires that dune speed be estimated with some accuracy so that an appropriate time step Δt is selected to complement the resolution of the measuring equipment.

Three main assumptions include: (1) each dune moves with relatively constant speed and shape, (2) the measured "slice" is two-dimensional, and (3) there is little or no suspended sediment. If the bed forms were three-dimensional, as is often the case in field conditions, one would need to account for the lateral sediment flux. In the flume used in validating the above method, there was very little lateral movement of the dunes, justifying a 2D assumption. An additional limitation with the method is that the sediment volumes represented by ABGA and FHEF in FIG. 1 are not captured when the two surfaces are subtracted from one another. However, the associated error is a systematic error, thus can be quantified.

Validation

The above method is validated with the data from a laboratory test series conducted at the USDA Agricultural Research Service-National Sedimentation Laboratory (ARS-NSL). Kuhnle, R., and R. Derrow, *Using the SedBed Monitor to Measure Bed Load*, Proceedings of Symposium on: Fundamentals and Advancements in Hydraulic Measurements and Experimentation, Buffalo, N.Y., Aug. 1-5, 1994. A re-circulating sediment flume was used measuring 30.5 m long, 1.22 m wide and 0.61 m deep. Flow depth d was about 0.365 m in all tests. The sand bed occupied approximately 0.15 m of the flume depth. The bed was composed of quartz sand with a median diameter of 0.8 mm and a standard deviation (sd) of 0.45φ(φ=−log₂D), where D is grain diameter in mm). The size and sd of the sand assured that transport would be predominantly as bed load, simplifying a comparison to total sediment load measurements. The slope of the flume was adjustable using gear-driven jacks located upstream and downstream from a center pivot. Water flow rate was set by a variable-speed pump and measured using a Venturi meter in the 0.41 m diameter flow return pipe. Total sediment load was measured using a calibrated density cell that determined the density of the sediment water mixture in the return pipe of the flume. The calibration of the density cell is described in Kuhnle and Derrow (1994).

Figure 2:
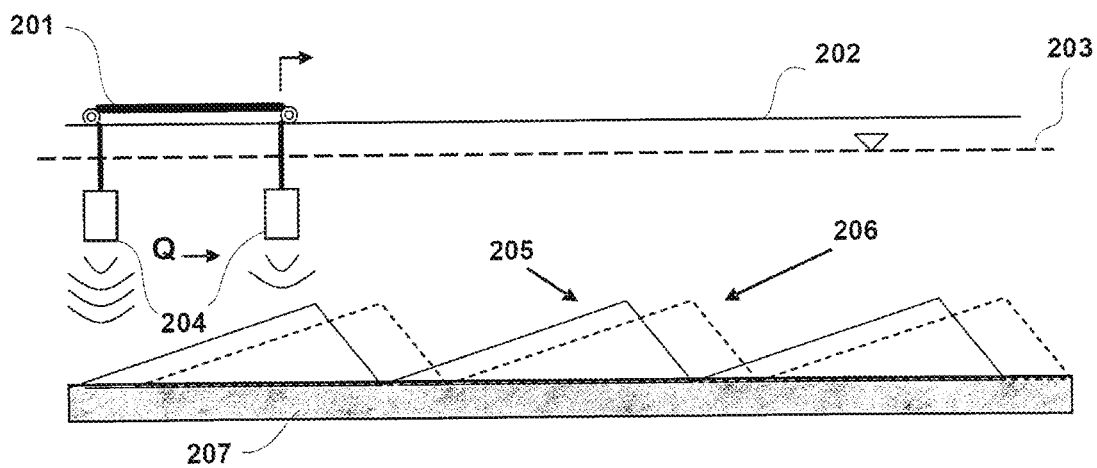
FIG. 2 is a schematic of a two-probe assembly used to measure two sequential profiles.

Refer to FIG. 2. Bed-surface and water-surface profiles were measured from a motorized carriage 201 that rode on steel rods 202 on top of the flume walls 203. Flow depths were calculated from the mean distances between the bed and water-surface profiles. Water-surface slope was calculated as the sum of the slopes of the flume rods (rods on the top of the flume walls on which the instrument carriage moves, or rolls) and the slope of the water surface relative to the flume rods. Before the first experiment, the bed was screed flat using an adjustable-height blade mounted on a carriage. The flume was run for a period of 40 hours before data were collected for the first experiment (designated as TNP-1 in Table 1) to assure that a stable bed configuration had formed. In higher-flow experiments, the flume was run for 20 hours before data were collected. Bed forms remaining from a previous experiment were used as the starting condition. Higher flow experimental runs followed the lower flow experimental runs in all cases.

Bed measurements began about 5 m downstream from the head box for approximately 15 m. The bed forms were approximately two-dimensional (2D) in all tests. The average height and length of the bed forms ranged from 0.06 m to 0.09 m and 1.6 m to 2.4 m, respectively (0.16 to 0.22 times flow depth and 4.4 to 6.6 times flow depth, respectively).

Bed measurements were made with two acoustic probes 204 mounted on the carriage 201 and separated by a longitudinal distance of 3.18 m. For the scour measurements, the carriage 201 was moved parallel with the flow Q, with the probes 204 following the centerline of the flume. The speed of the carriage 201, $V_p$, was precisely controlled by a stepping motor (not shown separately) and ranged from 0.0126 m/s to 0.0379 m/s, depending on the migration speed of the dunes. The speed of the dunes was measured to allow accurate measurement of the rate of scour. Each probe 204 mapped the same wave offset in time by Δt. The time difference between the first 20 and second 206 mapping (Δt) ranged from 84 seconds to 252 seconds. Flow conditions are summarized in Table 1. The last column in Table 1 shows computed bedload from scour rates using Eqn. (5) with β=0.55. The Froude number ranged from 0.243 to 0.502. In each experiment, the bed was profiled several times. Individual, computed results for all six experiments are listed in Table 2.

TABLE 1

Flow Conditions, Measured and Calculated Bed Load Transport Rates

| Experiment No. | Flow Rate (m³/s) | Flow Depth (m) | Average Velocity (m/s) | Water Slope | Probe Velocity (m/s) | Measured Bedload (kg/s-m) | Bedload Calculated from Scour Rates (kg/s-m) |
|---|---|---|---|---|---|---|---|
| TNP-1 | 0.203 | 0.362 | 0.459 | 0.34 | 0.0126 | 0.006 | 0.009 |
| TNP-2 | 0.257 | 0.368 | 0.571 | 1.07 | 0.0126 | 0.029 | 0.026 |
| TNP-3 | 0.302 | 0.366 | 0.678 | 1.90 | 0.0126 | 0.066 | 0.062 |
| TNP-4 | 0.341 | 0.365 | 0.766 | 2.78 | 0.0252 | 0.118 | 0.134 |
| TNP-5 | 0.387 | 0.363 | 0.874 | 3.13 | 0.0252 | 0.225 | 0.206 |
| TNP-6 | 0.426 | 0.367 | 0.952 | 3.74 | 0.0379 | 0.317 | 0.334 |

TABLE 2

Average Computed Bedload from Scour Rates for all Sweeps and Experiments.

| | COMPUTED TRANSPORT (kg/s-m) FOR STATED EXPERIMENTS | | | | | |
|---|---|---|---|---|---|---|
| Sweep No. | TNP-1 | TNP-2 | TNP-3 | TNP-4 | TNP-5 | TNP-6 |
| 1 | 0.0063 | 0.0239 | 0.0549 | 0.1440 | 0.1541 | 0.2935 |
| 2 | 0.0121 | 0.0259 | 0.0581 | 0.1108 | 0.2529 | 0.3594 |
| 3 | 0.0118 | 0.0227 | 0.0718 | 0.1543 | 0.2695 | 0.3183 |
| 4 | 0.0078 | 0.0259 | 0.0558 | 0.1055 | 0.1790 | 0.3791 |

TABLE 2-continued

Average Computed Bedload from Scour
Rates for all Sweeps and Experiments.

| | COMPUTED TRANSPORT (kg/s-m) FOR STATED EXPERIMENTS | | | | | |
|---|---|---|---|---|---|---|
| Sweep No. | TNP-1 | TNP-2 | TNP-3 | TNP-4 | TNP-5 | TNP-6 |
| 5 | 0.0084 | 0.0282 | 0.0878 | 0.1349 | 0.1742 | 0.2587 |
| 6 | 0.0055 | 0.0334 | 0.0472 | 0.1728 | 0.2402 | 0.2947 |
| 7 | 0.0089 | 0.0220 | 0.0630 | 0.1562 | 0.2152 | 0.3433 |
| 8 | | 0.0272 | 0.0493 | 0.1196 | 0.1828 | 0.3845 |
| 9 | | 0.0257 | 0.0568 | 0.1186 | 0.1851 | 0.4257 |
| 10 | | | 0.0713 | 0.1220 | | 0.3372 |
| 11 | | | | | | 0.2839 |
| AVE. | 0.0087 | 0.0261 | 0.0616 | 0.1339 | 0.2059 | 0.3344 |
| SD | 0.0025 | 0.0034 | 0.0123 | 0.0223 | 0.0401 | 0.0503 |

Figure 3:
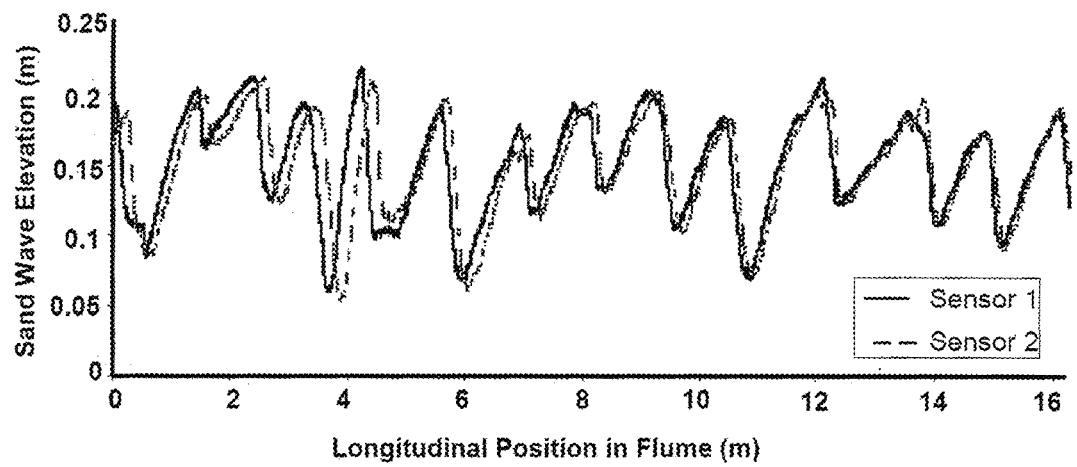
FIG. 3 shows two sequential profiles taken from a validation experiment.
Figure 4:
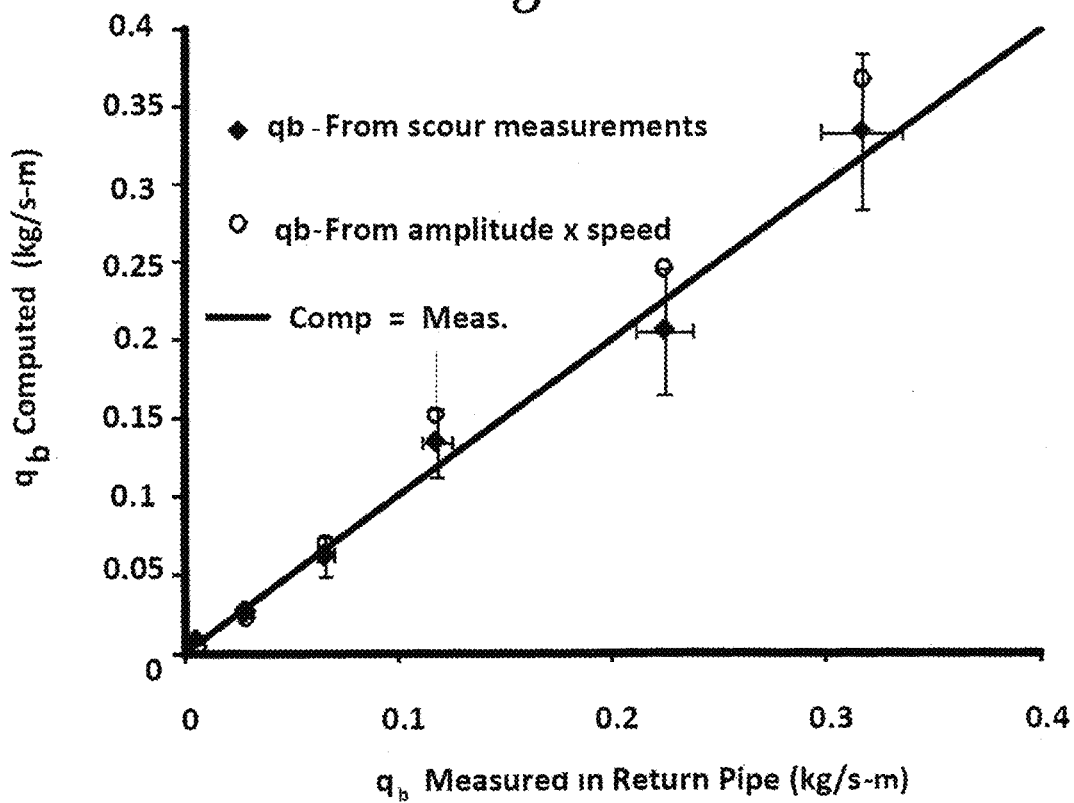
FIG. 4 is a graph comparing bedload transport rates calculated from scour measurements with measurements of bed-form amplitude and speed with rates measured with a density cell in a return pipe.

Refer to FIG. 3 showing two sequential profiles taken from the TNP-2-1020 experiment (Sweep No. 6 in Table 2). The solid line represents the bed surface profiled by the first sensor 204 passing over the bed 207. The broken line represents the bed surface profiled by the second sensor. With the probes moving at a speed of $V_p=0.0126$ m/s, the time lag is $\Delta t=252$ seconds. This time lag was sufficient to accurately determine scour volumes. The calculation included subtracting sequential bed elevations of the upstream face of the dunes extended to the side walls to get $\Delta V$, multiplying by $\beta \rho_s(1-\rho)$, and dividing by $\Delta t$. With $\beta=0.55$, the results for the twelve peaks shown in FIG. 3 are from left to right in kg/s-m, 0.041, 0.028, 0.035, 0.10, 0.008, 0.049, 0.031, 0.020, 0.026, 0.029, 0.014, and 0.011, with an average of 0.033 kg/s-m. The variability in transport rate is due to the different sizes of the waves and different depths of scour. In Experiment TNP-2, the bed was swept nine times in a 24-hour period. The average value for each sweep is listed in Table 2. As seen in Table 2, the average transport rate using scoured volumes for the nine sweeps of TNP-2 was 0.0261 kg/s-m. The same procedure was applied in the other five experiments (TNP-1 and TNP-3 to -6). Table 1 lists the flow conditions for all six experiments and the calculated bed load transport (last column) as determined from the scour measurements. For comparison, Table 1 in the next to last column also lists the bed load transport rates that were measured directly in the return pipe using a density cell. This comparison is also presented graphically in FIG. 4. It is seen that the agreement between the measured bedload and bedload calculated from scour rates is good. The bedload transport computed from scour rates is also in good agreement with the computed bedload transport based on bed-form amplitude and speed. Kuhnle and Derrow (1994). Amplitudes in each transect were obtained from mean absolute deviation from mean bed plane of each transect. Mean migration speed was obtained from the rate of translation of the bed-form amplitudes.

Discussion and Error Analysis

There are several sources of uncertainty with a bed-form tracking technique, whether it is based on measuring rates of scour on the upstream face of the bed forms or whether it is based on measurements of bed-form amplitude and speed. The sources of uncertainty include defining the shape of actual dunes. The shape is not perfectly triangular. Moreover, there is a tendency of dunes to superimpose on one another as they migrate downstream. The superposition makes it difficult to calculate dune characteristics and dune migration speeds. There is also evidence (Crickmore 1970; Engel and Lau, 1980, 1981) that the point of zero bed load transport is not at the trough of dunes but a small distance up on the upstream face. Crickmore, M. J., *Effect of Flume Width on Bed-Form Characteristics*, Journal of the Hydraulics Division, ASCE, HY2, February, 1970; Engel, P. and Y. L. Lau, *Computation of Bed Load Using Bathymetric Data*, Journal of the Hydraulics Division, ASCE, Vol. 106, No. HY3. Therefore, the bed-form amplitude may not be exactly the distance from trough to crest. These uncertainties are characterized as random and are included in the standard deviations of the computed transport rates listed in Table 2 and shown graphically by the vertical error bars in FIG. 4. The accuracy of bed-elevation measurements is ±1 mm. using this value and an average $\Delta \eta$ from each of the runs, the uncertainty due to instrument resolution was determined to be ±31, 8, 4, 4, 3 and 3% in TNP 1 to TNP 6, respectively. The uncertainty in the mean sediment transport rate measured in the return pipe is a combination of the uncertainty of the flow discharge measurement (about 1%) and the uncertainty of the sediment concentration determination (10%) from the density cell for readings collected over a short period of time (2 minutes). The uncertainty of the mean sediment concentration collected over a long period of time (4 hours) as in this study would be expected to reduce the uncertainty of the mean concentration readings to about 5%. The uncertainty of the sediment concentration readings is thus estimated to be about 6%. These are shown as the horizontal error bars in FIG. 4. As indicated earlier, a systematic error is introduced when two bed surface areas are subtracted.

Figure 5:
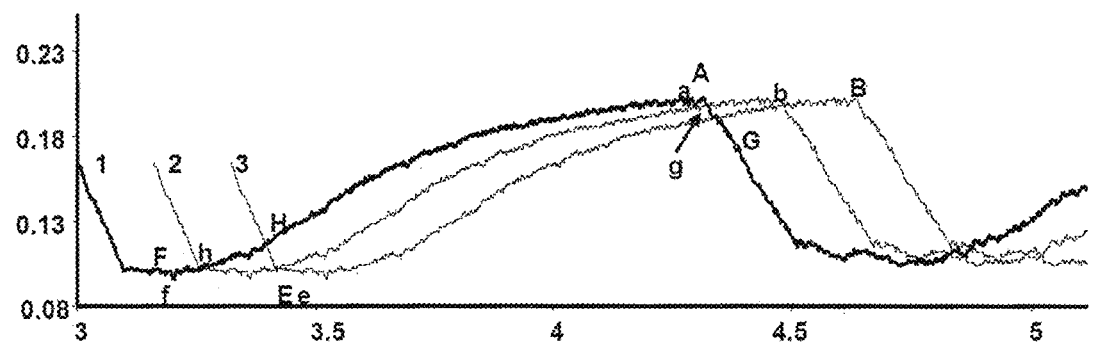
FIG. 5 shows the profile of a typical dune taken from a flume.

The error, which is specific to the scour method, is the volume represented by ABGA and FHEF in FIG. 1. This volume is "missed" when two successive dune faces are subtracted from one another. In reality, this volume is relatively small. FIG. 5 shows the profile of a typical dune taken from the flume. When the dune is shifted one tenth of its length downstream (to the right) from wave 1 to 2, the 'missed' volume is represented by abga and jhef, which is seen to be small compared to the volume represented by hagh. Thus the 'shape' error is very minimal as long as the shift $\Delta t$ is small. A quantification of the upper limit or worst case error is obtained with reference to FIG. 1. As a proportion of the volume represented by ABEF, the error is $$\varepsilon = \frac{V_s \Delta t}{\lambda} = \Delta \eta / \eta$$

where $\Delta \eta$=vertical distance between the two surfaces represented by AF and BE. An error of, say, 10% ($\varepsilon=0.1$) would occur if $\Delta x = V_s \Delta t = 0.1 \lambda$.

In FIG. 5, this would be a shifting of the profile from 1 to 2. As mentioned, the error is systematic. Given $\Delta t$, the error can be estimated and measurements adjusted accordingly. However, instrument resolution (±1 mm for the probes used in this study) sets a lower limit on $\Delta \eta$ and, thus, $$\frac{V_p}{U} = \frac{1}{\varepsilon} \frac{L}{\lambda} \frac{V_s}{U} \tag{6}$$

a lower limit on $\varepsilon$ and $\Delta t$. If probe speed is $V_p$, and distance probes L, then $\Delta t = L/V_p$, and a corresponding probe speed and associated error, $\varepsilon$, is given by knowledge of the average speed and length of the dunes is necessary. The length of the dunes in the flume ranged from roughly 1.6 m to 2.4 m corresponding to a λ/d range from roughly 4.4 to 6.6, where:

U=water-flow velocity

To use this equation for setting probe speed or estimating an error, some knowledge of the average speed and length of the dunes is necessary. The length of the dunes in the flume ranged from roughly 1.6 m to 2.4 m corresponding to a λ/d range from roughly 4.4 to 6.6, with an average of about 5.4, where d is the depth of flow. This average is slightly less than that suggested by Julien and Klassen (1995) of 6.25, based on much laboratory and field data. Julien, P. Y., and G. J. Klaassen, *Sand-Dune Geometry of Large Rivers During Floods*, Journal of Hydraulic Engineering, ASCE, 121, 657-663, 1995. Dune speed in the flume ranged from about 1×10$^{-4}$ m/s to about 4×10$^{-3}$ m/s, depending on Froude number. The dependence on Froude number is similar to that proposed (empirically) by Kondap and Garde (1973), $$\frac{V_s}{U} = K \times F^3 \quad (7)$$

where:
F=Froude number, and
K=constant of the order of 0.02 to 0.03
Kondap, D. M., and R. J. Garde, *Velocity of Bed Forms in Alluvial Channels*, Proceedings of the 15$^{th}$ Congress of International Association for Hydraulic Research, Vol. 5, Istanbul, Turkey, 1973.

This relationship is based on data from laboratory experiments having depths of less than 1 m and grain sizes in the range between 0.18 mm and 2.28 mm. Dune tracking in the current flume study shows good agreement with Eqn. (7) when K=0.03. Thus, a reasonable guide for estimating the systematic error for this laboratory study would be $$\frac{V_p}{U} = 0.006 \frac{1}{\varepsilon} \frac{L}{d} F^3 \quad (8)$$

Figure 6:
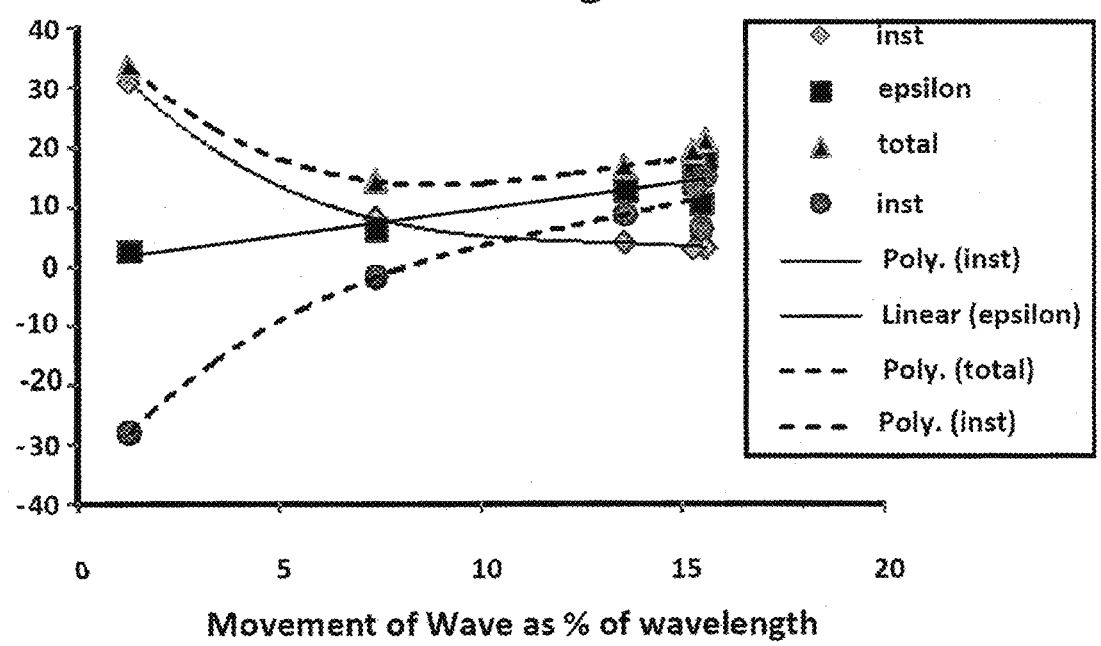
FIG. 6 is a plot of the instrument error, systematic error epsilon, and the sum of the two as the total non-random error.

Using Eqn. (8) and values from the different TNP runs, the percent error was 3, 6, 13, 10, 18 and 16% for TNP runs 1 through 6, respectively. A plot of the instrument error, systematic error epsilon, and the sum of the two as the total non-random error are shown in FIG. 6. A minimum total error of about 15% is noted when a wave has moved about 7 to 8% of its length as shown by the intersection of the lines for epsilon and the instrument. This is assuming that the instrument error is positive and is shown by the top dashed-line with the triangles, the minima of which occurs near the same location. The lower dashed-line with X's indicates negative instrument error values. It is meaningless for values below zero, but can provide a lower limit on the total error for values above zero. The average wave length movement was not greater than 16% in this lab experiment, and thus the errors for values of wave movement greater than that can only be extrapolated. Since the relationship between epsilon and wave movement is somewhat linear, one could extend the lines to the right to obtain reasonable estimates. By estimating actual boat speed, wave lengths and dune speeds before beginning a data collection campaign, the above methodology and equations may be used to optimize field data collection efforts.

However, since field conditions seldom allow a priori information gathering on wave lengths and speeds, and since many dune fields are quite variable with respect to those same variables, Eqn. 6 is not readily usable for errors in field data. Also, because of the large areal extent of field sites, it often requires a longer period of time to return to a given location for the repeat surveys which leads to much larger than optimal time intervals (Δt). For these reasons, a more practical method of accounting for the systematic error due to 'missed areas' was determined. The correction technique makes use of the fact that as Δt☐increases, the computed transport value decreases linearly. When a best fit line is plotted through the data points, the y-intercept of the line indicates the actual dune transport. Thus the systematic error due to 'missed areas' can be accounted for.

In summary, by comparing rates of scour measured on the upstream face of dunes with directly measured bed load transport rates, for dunes traveling at nearly constant speed with nearly constant shape and with no suspended load present, Eqn. (5) provides a valid basis for the technique. The value of β (0.55 is used in Eqn. (5)) is in agreement with that found by Wilbers (2004), i.e., within the range of 0.5 to 0.63 with a best value of 0.57. For laboratory flumes, probe speed and error, ε, may be determined using Eqn. (8). The error for the transport computations using the scour method (ISSDOTv2) was a maximum of about 34% when wave movement was 1 to 2% of the wave length, a minimum of 15% when wave movement was 7 to 8% of the wave length and about 20% when wave movement was 15 to 16% of the wave length. Thus, under the given conditions, bed load transport determined from time sequenced bathymetric data is equally accurate to that determined from measurements of bed-form amplitude and speed. Obtaining bed load transport from time sequenced bathymetric data is also more expedient than traditional methods. Field applications will consider factors such as the systematic error correction mentioned above as well as translation and deformation of wave forms due to the nonlinear nature of the flow and the threedimensionality of bathymetric surfaces. McElroy, B., and D. Mohrig, *Nature of Deformation of Sandy Bed Forms*, Journal of Geophysical Research, Vol 114, F00A04, doi:10.1029/2008JF001220, 2009; Shelley, J., Abraham, D., and McAlpin, T., *Removing systemic bias in bed-load transport measurements in large sand-bed rivers*. In publication ASCE, March 2013. Singh, A. et al, *Experimental Evidence for Statistical Scaling and Intermittency in Sediment Transport Rates*, Journal of Geophysical Research, Vol. 114, F01025, doi:10.1029/2007JF000963, 2009.

To implement this method in select embodiments of the present invention, the following tasks are performed.

Data Collection Methodology

*Multi-beam collection for Integrated Section Surface Distance Over Time Version 2 (ISSDOTv2) Bed Form Analysis.* The survey equipment that may be used to implement select embodiments of the present invention includes: an Inertial Motion Unit (IMU), a multi-beam fathometer and a Real Time Kinematic (RTK) Global Positioning System (GPS). These components are integrated into a hydrographic survey package, such as a Hypack®. Multi-beam fathometers may be 250-KHz and 500-KHz Geoswath® Plus interferometric multi-beam sonar with an Applanix® PosMV IMU. Real-time GPS data are supplied by a Trimble® R8 GNSS and broadcast to the PosMV for positioning and time tagging of all instruments. It should be noted that the survey equipment is not limited to any particular hardware or software vendor.

Collection Method

In select embodiments of the present invention the bathymetric data used in the ISSDOTv2 methodology is collected with attention to detail not needed during traditional multi-beam survey methods. In example embodiments, the data am collected to provide a plurality of survey data values for n points, where n can satisfy various expressions including n≤10,000, n≤1,000, and n≤100. First, choose the area for surveying that has the best chance of having wave forms moving along the bottom. This can be known for a given reach of river through past experience. If such experience is not available, then a boat equipped with either a single or multi beam echo sounder must be used to make some trial runs in order to determine if waves are present, and their approximate rate of downstream migration. Data are collected over a length and width of channel to capture multiple waveforms in a short period of time. This 'short' period of time should be long enough so that average surface elevation changes are greater than the measuring instrument resolution (usually about 0.1 ft), but not longer than the time it takes for a sand wave of average length to move one-tenth of its length. In large sand-bed rivers like the Mississippi, Missouri. Snake and Columbia, this time interval has varied from about 20 to 120 minutes. Survey the channel width bank to bank (or as close as possible based on limitations of equipment and safety) to capture inherent variability of bed form migrations. Survey lines are run in a direction along the length of the channel with approximately 20% overlap with each successive line. Re-survey lines are run by logging the beginning survey time and using initial survey lines in the same direction and with the same boat speed to assure accurate data for comparison. Typical multi-beam collection ranges from 3-8 knots boat speed. Boat speed along each line needs to be noted during collection so that the same speed can be maintained for each line in the direction of travel. This assures the same time difference between all bathymetric points in each re-surveyed swath. In general, insuring that conditions are the same for line to line comparisons assures the most accurate results.

Processing Raw Field Data

The processing of raw multi-beam data is not equipment or software specific. We used Hysweep® software as collection and processing software, but other software and processing packages are available that can collect and process multi-beam data to the required format for the present method to be applied. The multi-beam data must be processed according to instrument vendor specifications to produce the most accurate data possible for the instrument and conditions The software packages employed with select embodiments of the present invention allow the user to clean the data of outliers after all of the vendor specified corrections, for example heave, pitch, roll and GPS latency adjustments have been applied as specified by the hardware/software vendor for the equipment utilized in the multi-beam collection effort. Once the lines have been cleaned then each individual line is processed as an individual data set. The ISSDOTv2 computations are performed on a survey-line basis. Thus, the data need to be processed on a survey-line basis and output in a gridded format at a resolution that captures the sand wave geometry in sufficient detail to completely define the shape of the individual waves. In field applications this has usually been a five to ten foot uniform rectilinear grid. The grid size could be smaller if necessary for smaller wave forms. The output format from the processing software is a uniform rectilinear grid of XYZ elevation data for the bottom topography on a survey-line basis.

Accounting for Deviations from the Theoretical Conditions

Figure 11:
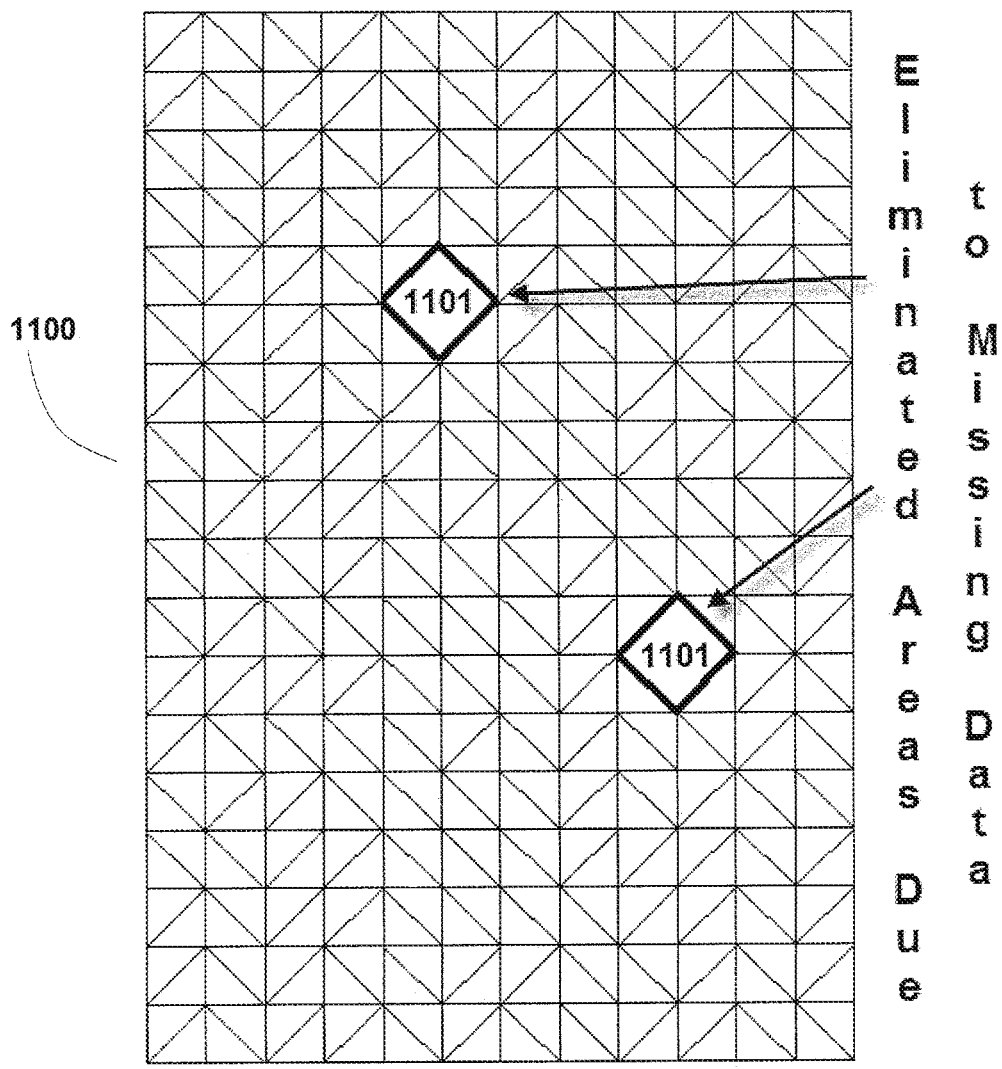
FIG. 11 shows a triangulated dataset with x, y, $z_1$, $z_2$, and $z_1$-$z_2$, values with "thin" (incremental) triangles removed.

In select embodiments of the present invention a technique accounts for actual sand waves deviating from ideal conditions of constant wave speed and shape with no bed-materialload going into suspension and no bed-material-load depositing. These ideal conditions were approximated in the flume study by which the theoretical underpinning of the method of select embodiments of the present invention was validated. However, in rivers, sand wave speeds are not constant and waves do change their shape. Additionally, some of the eroded bed-material-load on the scouring face of the wave does go into suspension, and some bed-material-load already in suspension does deposit on the waves. Therefore, some quantitative technique is required to qualify a data set as useable. An example of the eroding side of a typical sand wave is the surface of the wave in FIG. 1 from F to A. This assumes that the wave is moving from left to right. The depositional side of the same wave in FIG. 1 is the surface from A to C. If the ideal conditions stated above are met, then 100% of the scoured sand on the eroding surface of a given wave will be deposited on the depositional side of the same wave. This would represent a steady state equilibrium sand transport condition. If this condition existed for all dunes in the entire dune-field (a series of spatially sequential dunes throughout the surveyed swath length), then one way to quantify any deviation from this ideal condition would be to verify that the average elevations of the dune field remained constant during the measurement interval. Thus the average elevation of data set #1 taken at time #1 should be equal to the average elevation of data set #2 taken at time #2. An extension of this concept is to create a difference file or plot of all spatially coincidental points from the two data sets. When subtracting the first data set from the second, all negative values may be represented as scour, and all positive values may be represented as deposits. Since the data are acquired in three dimensions, the volume of scour or deposition can be determined by computing the volume under each erosional or depositional computational cell and summing them. These computational cells are shown in FIG. 11 and described in the section titled *Bedload Transport MATLAB® Code Methodology*. In equilibrium, the total volume of scour cells should equal that of deposition cells. Dividing the volume of scour cells by that of depositional cells yields a ratio of scour to deposition, ideally equal to one at equilibrium during the measurement interval. All quantitative values discussed so far relate to averaged values over the spatial extent of the dune field and over the time interval between measurements. Any deviation from a value of one for the scour-deposition ratio would indicate a value of sand transport in the dune that was decreased (if an excess of scoured material went into suspension) or increased (if an excess of already suspended material deposited). Thus, for a computed sand transport value for scour-deposition (s/d) ratios not equal to one, the computed value of transport may differ from the ideal value by an amount of the % difference of its s/d ratio from the value of one. From this line of thinking it follows that a difference plot with an s/d ratio of 1.2 or 0.8 may be in error by 20%. Applying these considerations to field data, one could literally correct the initially computed transport value. An anomaly noted in early field trials was computed s/d ratios in excess of 6 and less than 0.3, indicating excessive erosional or depositional trends during that given measurement interval. Such values indicate gross departures from the ideal condition of equilibrium transport, and thus may indicate possible gross errors in the calculated values, and completely undependable computed transport results. Thus, rather than use the computed s/d ratio as a correction, it is employed as a criterion by which data sets are qualified as usable. Assuming that deviation of the s/d ratio from one is an indicator of percent error, select embodiments of the present invention set the error of the computed erosion rates at no greater than 20%. Also, if some s/d ratios are greater than one and others less than one, they may cancel out. Thus each data set is tested for equilibrium transport via a s/d ratio and the result used as an initial quality control, minimizing any error due to non-equilibrium transport conditions and eliminating unqualified data sets.

Bedload Transport MATLAB® Code Methodology

With select embodiments of the present invention, under the previously discussed conditions, bed load transport determined from time sequenced bathymetric data is equally accurate to that determined from measurements of bed-form amplitude and speed. Obtaining bed load transport from time sequenced bathymetric data is often more expedient than traditional methods. Select embodiments of the present invention utilize measured multi-beam bathymetric data and apply a modified version of Eqn. (5), subject to additional constraints and modifications arising from field data applications as described below.

Although a theoretical method was developed to compute bedload in a single wave Eqn. (5) that may not be practical in field applications thus, modifications may be necessary. Instead of delineating each wave and the transport in each one, a more accurate, averaged transport rate is determined for an entire swath. In the field, a given wave may have numerous other waves spatially ahead and/or behind. Thus, the calculation of the bedload transport using only the information for a single wave could be misleading if all the waves are not homogeneous in size and speed. Therefore Eqn. (5) may be modified to determine the average transport over a given distance. Eqn. (5) can be modified by:

1) $\Delta V$ is defined as the total erosion for the entire swath as opposed to the erosion for a single wave. An alternative method using deposition is defined for comparison purposes.
2) The transport value is divided by the number of waves to convert the newly defined $\Delta V$ into a $\Delta V$ per wave resulting in an averaged transport rate.

These alterations result in Eqn. (5) becoming:

$$T = \frac{-96 \times E}{2\Delta t (SW)(NW)} \text{ (erosion)} \quad (9)$$

$$T = \frac{-96 \times D}{2\Delta t (SW)(NW)} \text{ (deposition)} \quad (10)$$

where:
T=Bedload Transport Rate
E=Erosion—determined using the surveyed area and the difference in bathymetry survey values as further discussed below.
$\Delta t$=Time Difference between bathymetry surveys (as noted during measurement and used as input to the code).
SW=Swath Width—determined using the total swath area and the profile lengths.
NW=Number of Waves—calculated by progressing along a longitudinal path from one end of the swath to the other as further discussed below.
D=Deposition—determined using the surveyed area and the difference in bathymetry survey values as further discussed below.

Where the $\Delta V$ is specified as the total erosion in the swath for Eqn. (9) and as the total deposition in the swath for Eqn. (10).

Figure 7:
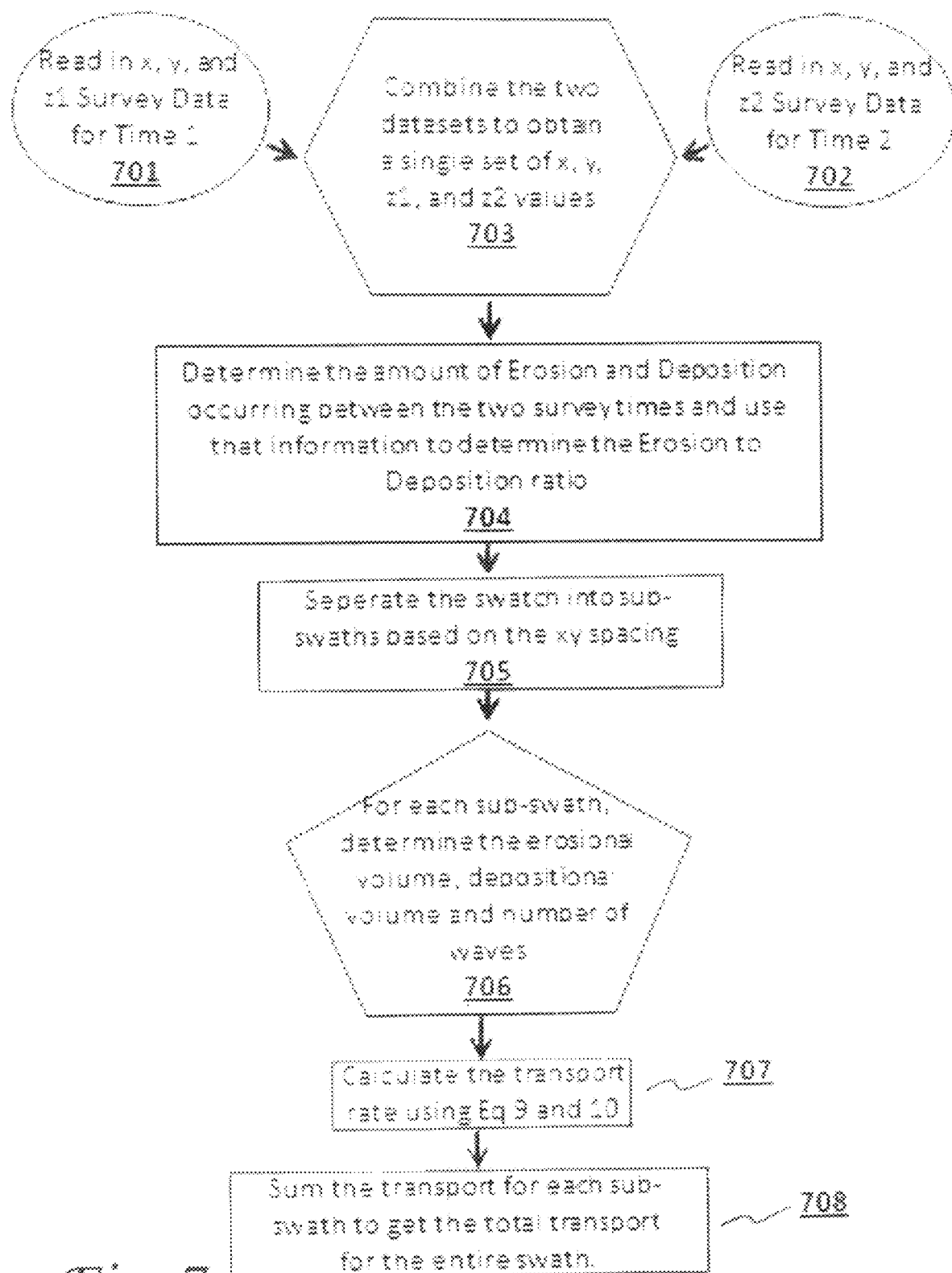
FIG. 7 is a flow diagram for employing select embodiments of the present invention.

FIG. 7 provides a general overview of the code methodology. To obtain a Total Erosion and Total Deposition measurement, a volume calculation must be performed. Thus, the following methodology was performed.

Figure 8:
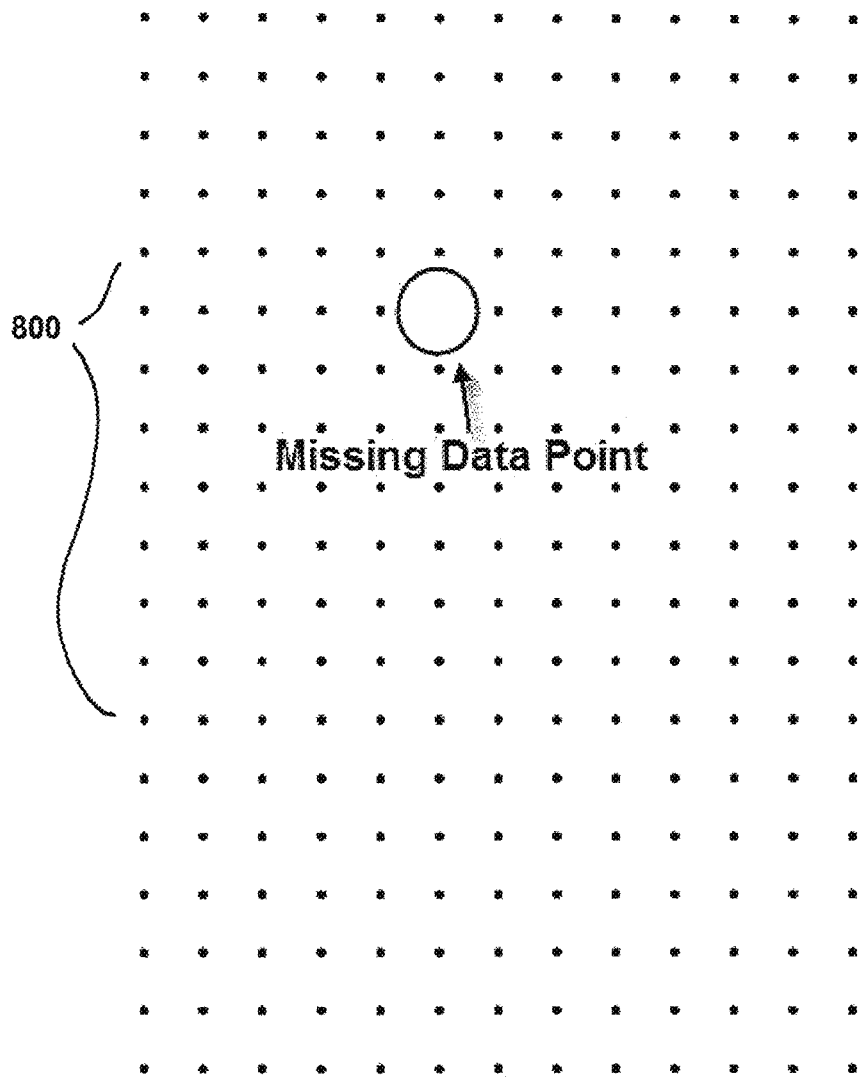
FIG. 8 is a set of multi-beam bathymetric survey data projected onto a uniform computational grid for a first time.
Figure 9:
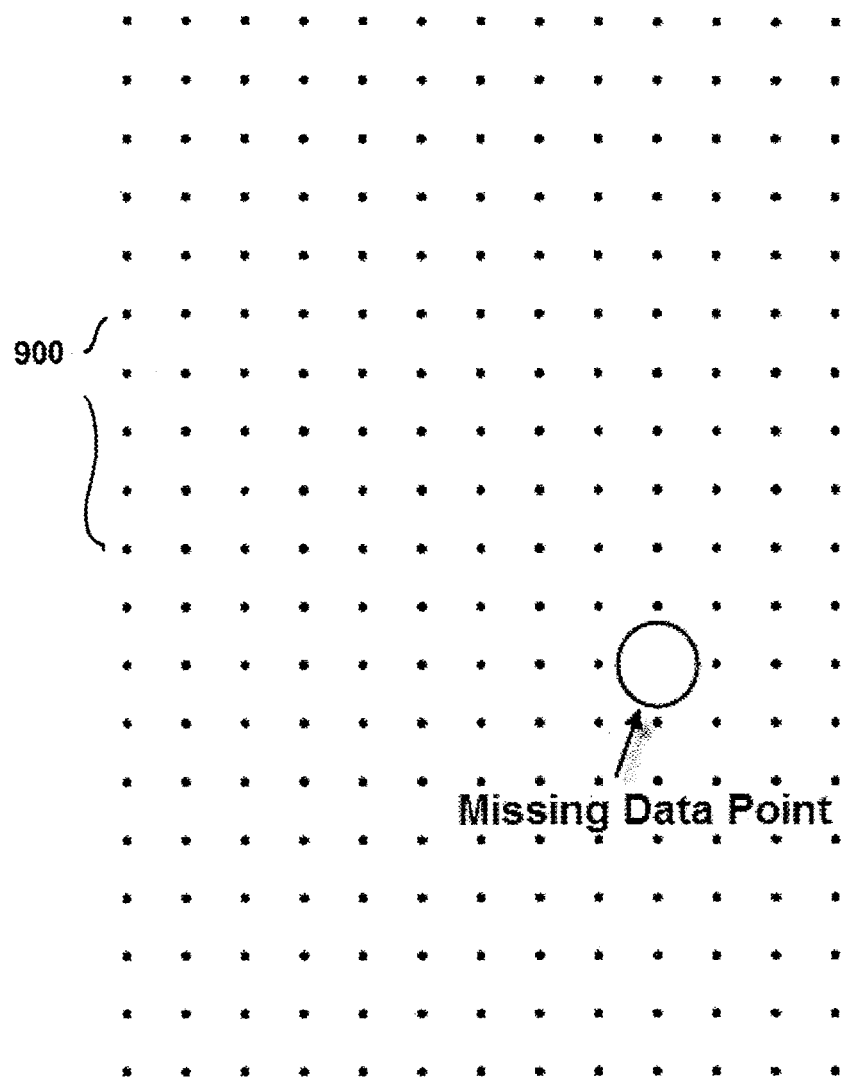
FIG. 9 is a set of multi-beam bathymetric survey data projected onto a uniform computational grid for a second time.
Figure 10:
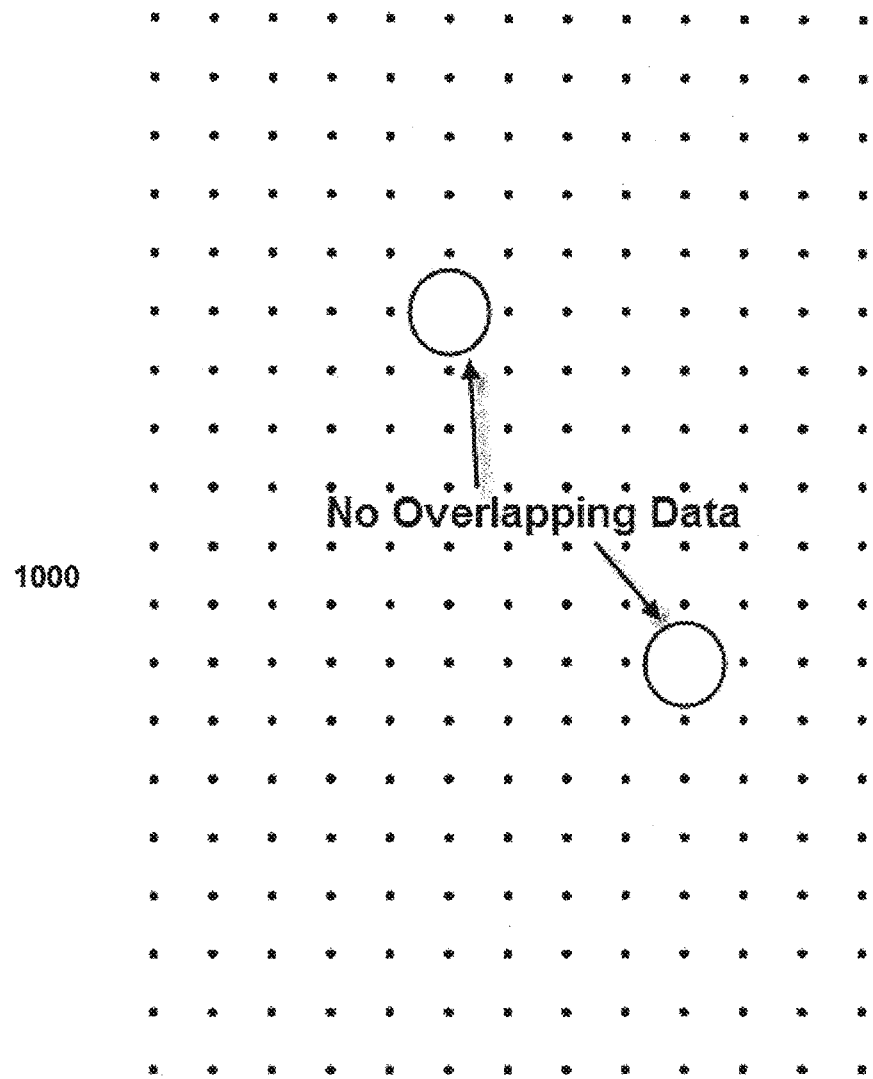
FIG. 10 is a set of multi-beam bathymetric survey data projected onto a uniform computational grid showing overlap of data from a first and a second time.

A method for applying select embodiments of the present invention is initiated by reading in the two survey datasets 701, 702. These are XYZ data files with regularly spaced points 800, 900. Schematized XYZ datasets as in FIGS. 8 and 9 are simplified for ready illustration. Next, at 703 determine the overlapping survey areas and create x, y, $z_1$, and $z_2$ data arrays as shown combined 1000 in FIG. 10. Element 1000 in FIG. 10 is meant to indicate every point or node except the two missing, or blank nodes or points. Each x, y location in FIG. 10 has a $z_1$, $z_2$ and thus a difference value of $z_2-z_1$ ($\Delta z$) can be computed at any of these locations. It should be noted that this dataset only contains xy points that have data in BOTH the FIG. 8 and FIG. 9 datasets. Missing data points in either dataset results in data gaps in the combined dataset. Missing points are evident in FIG. 10.

For select embodiments of the present invention the MATLAB® Delaunay Triangulation is used to obtain the best triangulation 1100 of the xy dataset. This program removes thin triangles by eliminating any triangles 1101 possessing a side with a length longer than twice the point spacing as illustrated by the two bold squares in FIG. 11. Each of these two squares was initially two triangles (one connecting the top point with the middle two and one connecting the bottom point with the middle two). They were removed because of the missing points shown in FIGS. 8 and 9 that resulted in the two missing points in FIG. 10. It is now possible to determine a change in volume using the $\Delta z$ values with the area of the triangulation previously created (shown in FIG. 11). Initially, erosion and deposition are determined for each element and then summed to obtain total erosion and deposition values for the entire domain. It is possible for a given element to be total erosional (i.e., all three $\Delta z$ negative), total depositional (all three $\Delta z$ positive) or some combination thereof. For a totally erosional element the three $\Delta z$ values are averaged and multiplied by the area of the triangle. Similarly the same is done if all three points are depositional. If the element has some erosion and some deposition then a linear interpolation is performed to determine the $\Delta z=0$ locations along the triangle edges. This allows the element to be separated into an erosional portion and a depositional portion. Next, the elemental erosion and deposition are determined in a similar manner as before using the average $\Delta z$ value over the erosion part times the erosional area of the element to get the erosion on that particular element with a similar process being applied for the deposition. These erosion and deposition values are then summed over all of the elements to get the total erosion and the total deposition.

The erosion and deposition values are used to determine the erosion to deposition ratio 704. This ratio is total erosion divided by total deposition volumes (E/D or $\Delta V_e/\Delta V_d$). If this ratio is equal to 1 then the sand waves are in an equilibrium state validating the usage of Eqns. (9) and (10). If an equilibrium transport condition exists, then any deposition is balanced by scoured material removed as suspended material. Extending this consideration to the entire bed, all scoured volume is compared to all deposition volume. If equal, then an equilibrium condition for material moving in the waves occurred during the measured time interval and either the scour or deposition volumes may be used in computing bedload (e.g., sand moving in the dune waves). Scour/deposition ratios between 0.8 and 1.2 are reasonable. Thus, ratios outside this range may not be used generally.

After calculating erosion and deposition values, the swath is subdivided into individual sub-swaths based on the resolution of the bathymetry data 705. As an example, a bathymetry dataset with 5 ft by 5 ft nodal spacing will be subdivided into individual 5 ft wide swaths that run the length of the larger swath with a sufficient number of sub-swaths to extend across the entire width of the bathymetry data. This step is important to accurately capture the lateral variation in the transport across the global swath width. The transport rate is determined for each of these sub-swaths using Eqn. (9) and Eqn. (10). These equations require knowledge of the number of waves, the erosion volume, the deposition volume, and the time difference between surveys. The erosion and deposition volumes are determined on the individual sub-swaths 706 (first portion of block 706, see below for second portion) in an equivalent manners previously described for the global swath in the preceding paragraph and the time difference between surveys is also known (recorded during data collection). Therefore, the only remaining parameters to be determined is the number of waves.

Figure 12:
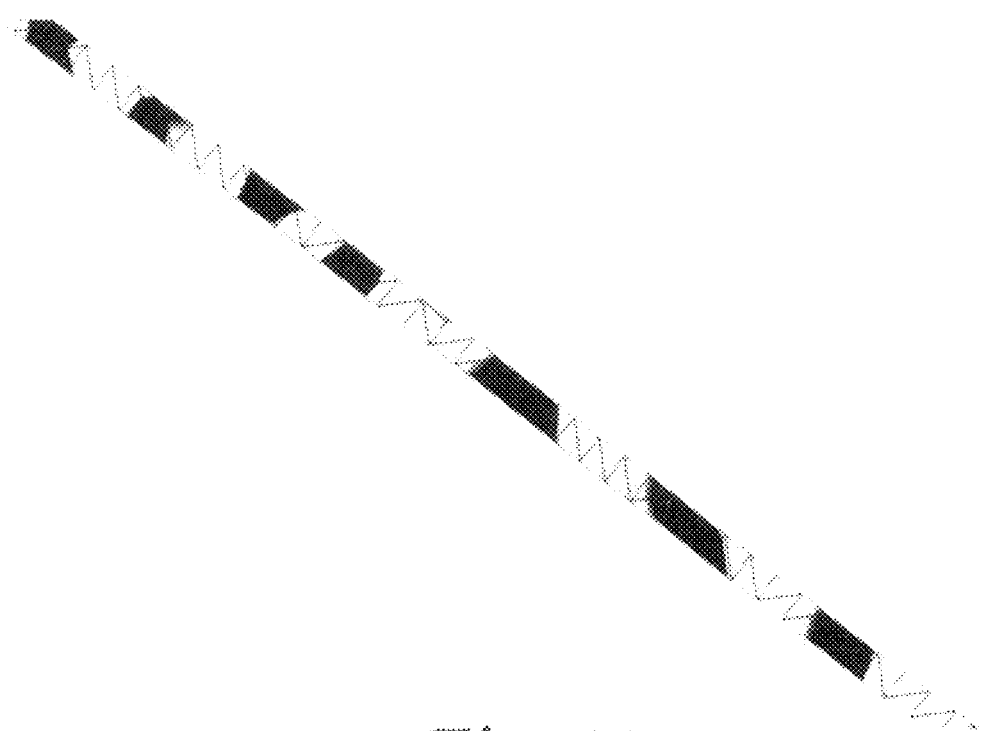
FIG. 12 shows an example sub-swath.
Figure 13:
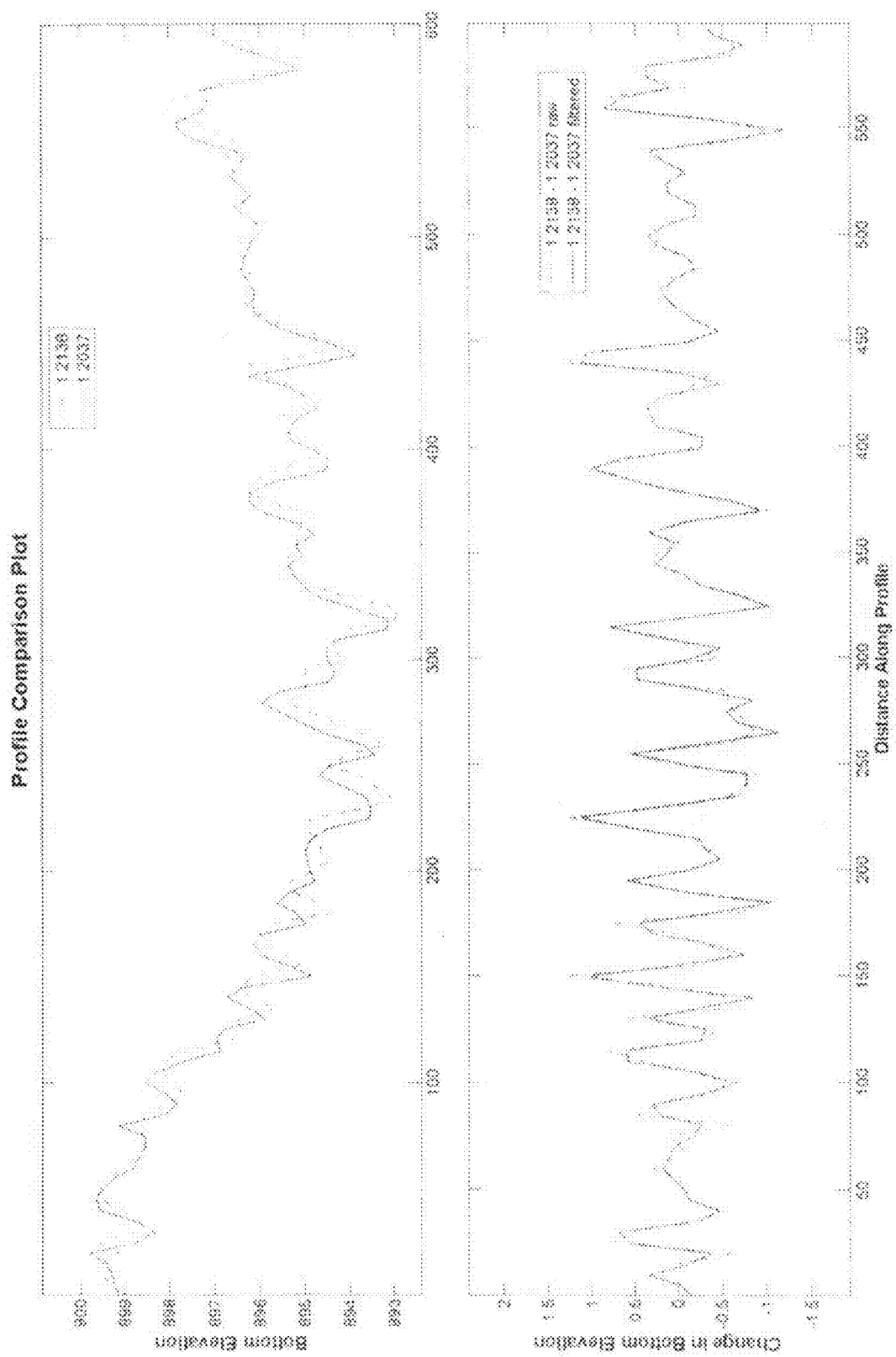
FIG. 13 shows a profile plot of nodes along a length of the swath.
Figure 14:
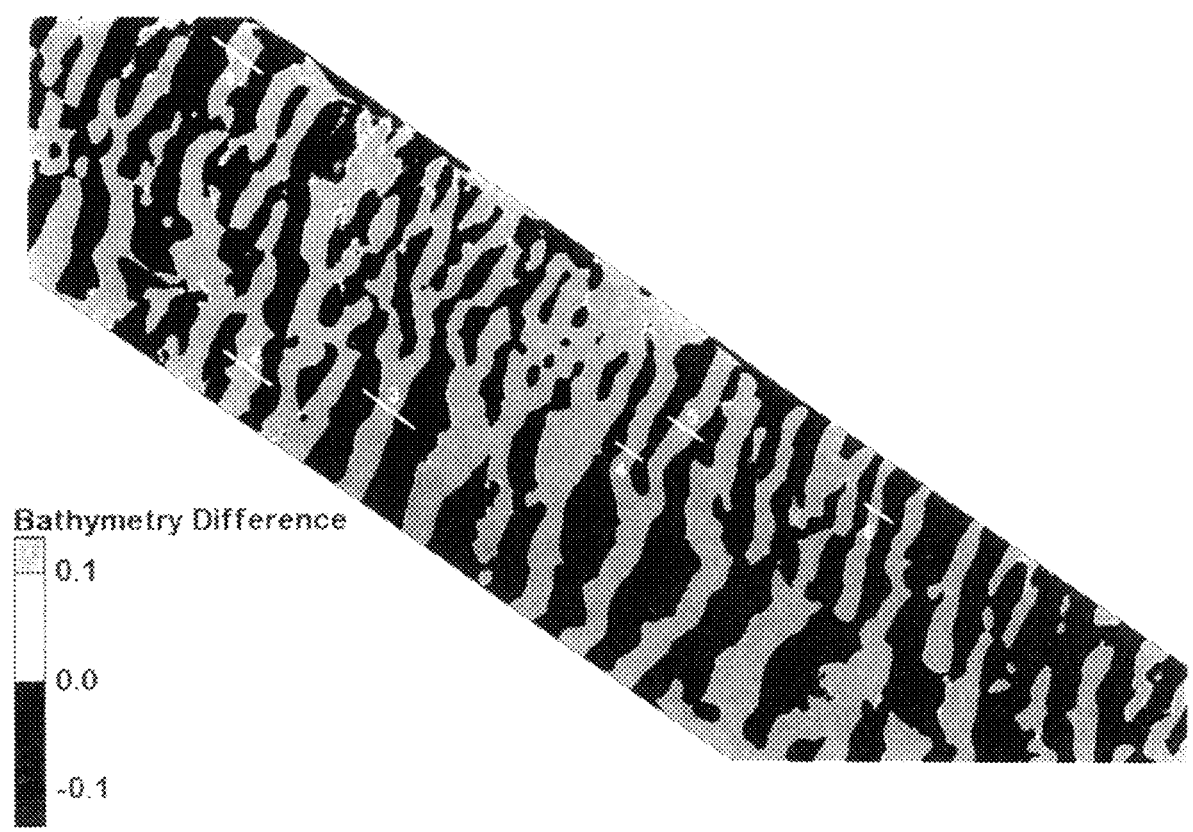
FIG. 14 shows how to determine the appropriate wavelength filter value.

The sub-swaths consist of two lines of nodes or profiles (see FIG. 12). The number of waves are determined for each of the profiles individually and then averaged to obtain the number of waves used in Eqn. (9) and Eqn. (10). For each of these two profiles x, y, $z_1$, and $z_2$ values are know. Using those known values, a distance along the length of the profile is determined with corresponding $z_1$, and $z_2$ values (see FIG. 13). The measured $z_1$ and $z_2$ values are then filtered to remove any noise and/or measurement error from the signals. The filtering is performed on a wavelength basis whereby any portion of the signal with a wavelength less than the user inputted lowest desired wavelength is removed from the signals. This wavelength filtering limit is a variable parameter that should be determined on a site specific basis. FIG. 14 demonstrates how the wavelength filter was determined for an example problem. The wavelength for the smaller waves of interested are determined as illustrated in FIG. 14. The wavelengths of some of the more general smaller waves of interest in FIG. 14 were 15 ft, 15 ft 20 n, 15 ft, 20 ft, and 20 ft, respectively for waves numbered 1 to 6. Therefore an appropriate wave filter length would be 10 to 15 ft. This would remove the components of the signal smaller than 10-15 ft without impacting the representation of the sand waves as waves with wavelengths larger than 15 ft would not be impacted. This is important as this process removes noise associated with measurement error and/or data anomalies. Then the filtered $z_1$, and $z_2$ values can be used to obtained a $\Delta z$ for each location along the profile. The number of waves is determined 706 (second portion) by counting the number of times the $\Delta z$ value crosses the 0.0 y-value and then dividing by two (a wave crosses the 0.0 y-value twice within a single wavelength).

For select embodiments of the present invention a check is performed for excessive missing data along a given profile. By using the total length of a profile and the spacing between xy points, an expected number of data entries are determined for a profile. Then a comparison is performed to determine if there are enough entries (xy points) to consider the profile valid (number of entries >0.50 times the expected number of entries are considered sufficient). If there are not enough data along a given swath profile, then the sub-swath is eliminated from use and the transport rates for adjacent sub-swaths are used to linearly interpolate to an appropriate transport rate for that particular sub-swath.

For select embodiments of the present invention, the swath width, the total erosion (E), the total deposition (D), the time between surveys, and the number of waves (for erosion and deposition) are then used in Eqns. (9) and (10) to determine transport rates 707. The total transport for the entire swath can be obtained by summing the transport for each sub-swath (708).

Figure 15:
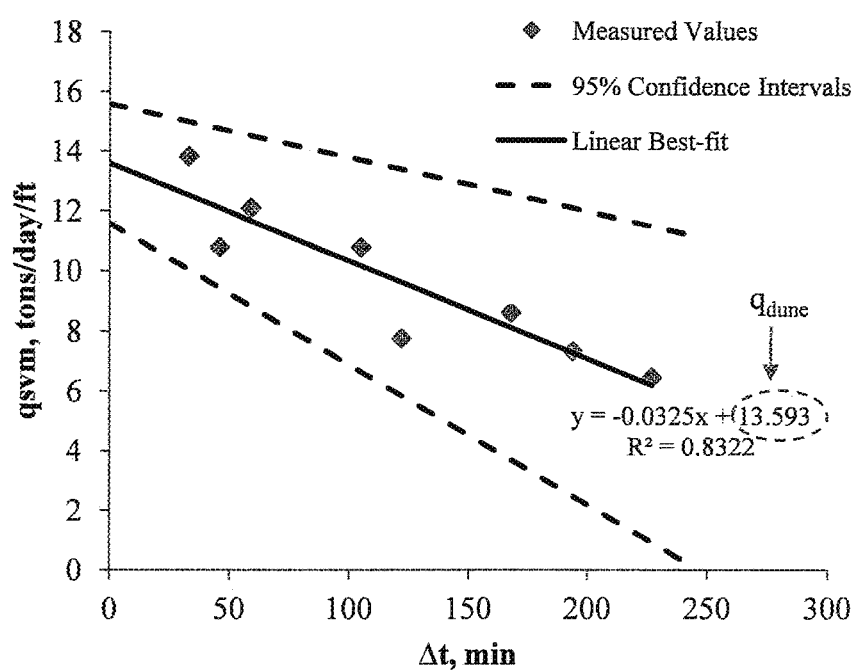
FIG. 15 shows application of error correction for actual applications.

At this point in the computational procedure, linear plots can be made of the resulting transport values and their respective time intervals ($\Delta t$), in order to apply the correction for the previously discussed systematic error due to 'missed areas'. This procedure can be incorporated into the Matlab code or performed independently in a spreadsheet or other computational tool. FIG. 15 shows how this is done for an actual field data example.

With these modifications to the original theoretical equation, and a methodology to perform the computations as embodied in select embodiments of the present invention, accurate estimates of bedload moving in sand waves can be obtained for measurements made in field conditions.

Select embodiments of the present invention are used to compute a reliable value for the bed-material load moving in sand waves on the bottom of large sand bed rivers. Use of select embodiments of the present invention not only provides a bedload transport rate for a given river section, but also quantifies the lateral variation of the bedload transport. This information can be very important to know for areas around lock and dam entrances and exits, water intake structures and river port facilities. A bedload sediment rating curve may also be developed using select embodiments of the present invention. Bedload rating curves are an invaluable resource for river mangers as they address issues such as maintenance dredging requirements, sand mining, and the availability of sand to maintain ecological habitat features of rivers such as islands and bars. Select embodiments of the present invention provide a means of quickly determining the geometric extant of the raw data, the timing interval, data set average elevations, difference plots, scour and depositional volumes, scour/deposition ratios, wave number statistics, and several bedload transport values. Select embodiments of the present invention also have a missing data check loop to assure that data gaps in raw data, as noted above, do not adversely affect computations. With select embodiments of the present invention, bedload transport determination may be made during actual data collection in near real time. This allows decisions to be made on valid bedload transport data onsite and other benefits such as providing real-time results to river managers. For example, an evaluation team can immediately determine if adjustments are necessary to data collection procedures, when enough data has been collected, and the like.

The abstract of the disclosure is provided to comply with the rules requiring an abstract that will allow a searcher to quickly ascertain the subject matter of the technical disclosure of any patent issued from this disclosure. (37 CFR 1.72(b)). Any advantages and benefits described may not apply to all embodiments of the invention.

While select embodiments of the present invention have been described, those skilled in the art will recognize that the invention can be practiced with modifications within the spirit and scope of the appended claims. For example, although the system is described in specific examples for determining sand bedload, it may be used for other materials that may be useful in such diverse applications as structural, mechanical, geological, and architectural applications and the like. In the claims, means-plus-function clauses are intended to cover the structures described herein as performing the recited function and not only structural equivalents, but also equivalent structures. Thus, although a nail and a screw may not_be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention shown be defined only in accordance with the following claims and their equivalents.

What is claimed is:

1. A method for determining an estimate of an overall bedload transport rate by using bedload transport rates for a plurality of subswaths and using relationships incorporated on a non-transitory computer readable storage media for use with a specially configured computer to operate survey equipment; the method comprising the steps of:
   (a) operating the survey equipment to perform bathymetry surveys in a surveyed area and obtain a resolution of nodal spacing of bathymetry survey data values by collecting a plurality of survey data values for points $X_n$, $Y_n$ and $Z_{n@T1}$ at time $T_1$, and subsequently obtaining a second plurality of survey data values for points $X_n$, $Y_n$ and $Z_{n@T2}$ at time $T_2$, said time $T_1$ and said time $T_2$ establishing a first time interval,
   (b) combining said plurality of survey data values at time $T_1$ and said second plurality of survey data values at time $T_2$ to obtain a set of $X_n$, $Y_n$, $Z_{n@T1}$ and $Z_{n@T2}$ values,
   (c) calculating an amount of erosion and an amount of deposition occurring in said first time interval, and calculating an erosion to deposition ratio by computing a volume under each erosion or deposition computational cell as established by the set of $X_n$, $Y_n$, $Z_{n@T1}$ and $Z_{n@T2}$ values, and summing corresponding volumes,
   (d) separating a swath into the plurality of subswaths based upon a distance between $X_n$ and $Y_n$ corresponding to the resolution of the nodal spacing of the bathymetry survey data values,
   (e) determining, for each of said plurality of subswaths, an erosion volume E, a deposition volume D and a number of waves NW determined by counting a number of times a $\Delta z$ value of the bathymetry survey data values crosses a 0.0 y-value and dividing by two, and
   (f) calculating for each of said plurality of subswaths, an erosion $T_e$ and a deposition $T_d$ transport rate using $$T = \frac{-96 \times E}{2\Delta t(SW)(NW)} \text{ (erosion)}$$

$$T = \frac{-96 \times D}{2\Delta t(SW)(NW)} \text{ (deposition)}$$

Wherein:
$T_e$=Bedload Transport Rate (erosion)
$T_d$=Bedload Transport Rate (deposition)
E=Total Erosion—determined using the surveyed area and a difference in the bathymetry survey data values
$\Delta t$=Time Difference between the bathymetry surveys, $T_1-T_2$
SW=Swath Width
NW=Number of Waves
D=Deposition—determined using the surveyed area and the difference in the bathymetry survey data values.

2. The method of claim 1 wherein the surveyed area is rectangular.

3. The method of claim 1 further comprising a step of summing the transport rate for said plurality of subswaths to obtain a total transport rate for the swath.

4. The method of claim 1 wherein said points are spaced in an orthogonal configuration.

5. The method of claim 1 wherein said bedload transport rate for erosion is $T_e$ and said bedload transport rate for deposition is $T_d$, and a bedload transfer rate ratio $T_e/T_d$ is from 0.8 to 1.2.

6. The method of claim 1 wherein $n \leq 100$.

7. The method of claim 1 wherein $n \leq 1,000$.

8. The method or claim 1 wherein $n \leq 10,000$.

9. The method of claim 1 wherein $\Delta t$ is from 20 minutes to 120 minutes.

10. The method of claim 1 wherein the number of waves for each subswath is determined by applying a wavelength filter.

11. The method according to claim 1 further comprising a step of improving an accuracy of the calculations of the bedload transport rate as a value of $\Delta t$ increases by calculating values for the bedload transport rate for multiple time intervals ($\Delta t$), and utilizing a linear regression with said values for the transport rate for the multiple time intervals.

12. A method for determining an estimate of bedload transport in near real time comprising operating survey equipment to collect bathymetry survey data values including a resolution of nodal spacing, and using relationships incorporated on a non-transitory computer readable storage media for use with a specially configured computer to apply the bathymetry survey data values using the relationships:

$$T = \frac{-96 \times E}{2\Delta t(SW)(NW)} \text{ (erosion)}$$

$$T = \frac{-96 \times D}{2\Delta t(SW)(NW)} \text{ (deposition)}$$

Wherein:
$T_e$=Bedload Transport Rate (erosion)
$T_d$=Bedload Transport Rate (deposition)
E=Total Erosion—determined using a surveyed area and a difference in the bathymetry survey data values
$\Delta t$=Time Difference between bathymetry surveys
SW=Swath Width
NW=Number of Waves
D=Deposition—determined using the surveyed area and the difference in the bathymetry survey data values.

13. The method of claim 12 wherein the surveyed area is rectangular.

14. The method of claim 13 wherein measured points in said surveyed area are spaced in an orthogonal configuration.

15. The method of claim 12 wherein said bedload transport rate for erosion is $T_e$ and said bedload transport rate for deposition is $T_d$, and a bedload transfer rate ratio $T_e/T_d$ is from 0.8 to 1.2.

16. The method of claim 12 wherein $n \leq 100$.

17. The method of claim 12 wherein $n \leq 1,000$.

18. The method of claim 12 wherein $n \leq 10.000$.

19. The method of claim 12 wherein $\Delta t$ is from 20 minutes to 120 minutes.

20. The method of claim 12 wherein the number of waves is determined by applying a wavelength filter.

* * * * *